United States Patent
Kalergis et al.

(10) Patent No.: US 9,950,674 B1
(45) Date of Patent: Apr. 24, 2018

(54) INTEGRATED UNDER SEAT CUSHION CONFIGURABLE STORAGE

(71) Applicant: Ford Global Technologies, LLC, Dearborn, MI (US)

(72) Inventors: Peter Nicholas Kalergis, Canton, MI (US); Frank Victor Bonello, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/334,402

(22) Filed: Oct. 26, 2016

(51) Int. Cl.
*B60R 7/04* (2006.01)
*B60R 11/00* (2006.01)
*B60N 2/30* (2006.01)

(52) U.S. Cl.
CPC ............ *B60R 7/043* (2013.01); *B60N 2/3009* (2013.01); *B60N 2/3045* (2013.01); *B60R 2011/0012* (2013.01)

(58) Field of Classification Search
CPC ............ B60R 7/043; B60R 2011/0012; B60R 2011/0014; B60R 2011/0015; B60N 2/3009; B60N 2/3045; B60N 2/305; A47C 7/62; A47C 1/121
USPC ..... 297/188.1, 188.01; 190/8, 31; 296/37.15
See application file for complete search history.

(56) References Cited

U.S. PATENT DOCUMENTS

| | | | | |
|---|---|---|---|---|
| 6,849 | A * | 11/1849 | Vogler | F16D 57/02 16/270 |
| 1,441,815 | A * | 1/1923 | Lindsey | B60N 2/10 297/188.1 |
| 2,907,378 | A | 10/1959 | Barecki | |
| 5,273,298 | A * | 12/1993 | Brown, Sr. | A63B 71/0045 206/315.1 |
| 5,622,404 | A | 4/1997 | Menne | |
| 5,927,800 | A * | 7/1999 | Stallworth | A47C 7/56 297/188.08 |
| 6,161,896 | A * | 12/2000 | Johnson | B60R 7/043 297/188.08 |
| 6,386,612 | B2 | 5/2002 | Hofmann et al. | |
| 6,390,547 | B1 * | 5/2002 | Spykerman | B60N 2/3047 296/37.15 |
| 6,540,279 | B1 | 4/2003 | Bargiel | |
| 7,517,014 | B2 * | 4/2009 | Schroeder | B64D 11/06 244/118.1 |
| 9,421,915 | B2 | 8/2016 | Kalergis et al. | |
| 2013/0313869 | A1 | 11/2013 | Aguirre et al. | |
| 2016/0193949 | A1 * | 7/2016 | Pywell | B60R 7/043 297/188.1 |

FOREIGN PATENT DOCUMENTS

WO    WO 2004077980 A1 *  9/2004  ......... A44B 18/0049

* cited by examiner

*Primary Examiner* — Milton Nelson, Jr.
(74) *Attorney, Agent, or Firm* — Vichit Chea; Price Heneveld LLP

(57) ABSTRACT

A vehicle seating assembly includes a seatback and a seat base including a first section and a second section where the first and second sections independently pivot between a raised position and a lowered position. An internal storage compartment is defined between the first and second sections of the seat base. An interior bin is coupled to the second section of the internal storage compartment where the interior bin independently pivots between the raised and lowered positions. A partition is coupled to a first section of the internal storage compartment.

20 Claims, 4 Drawing Sheets

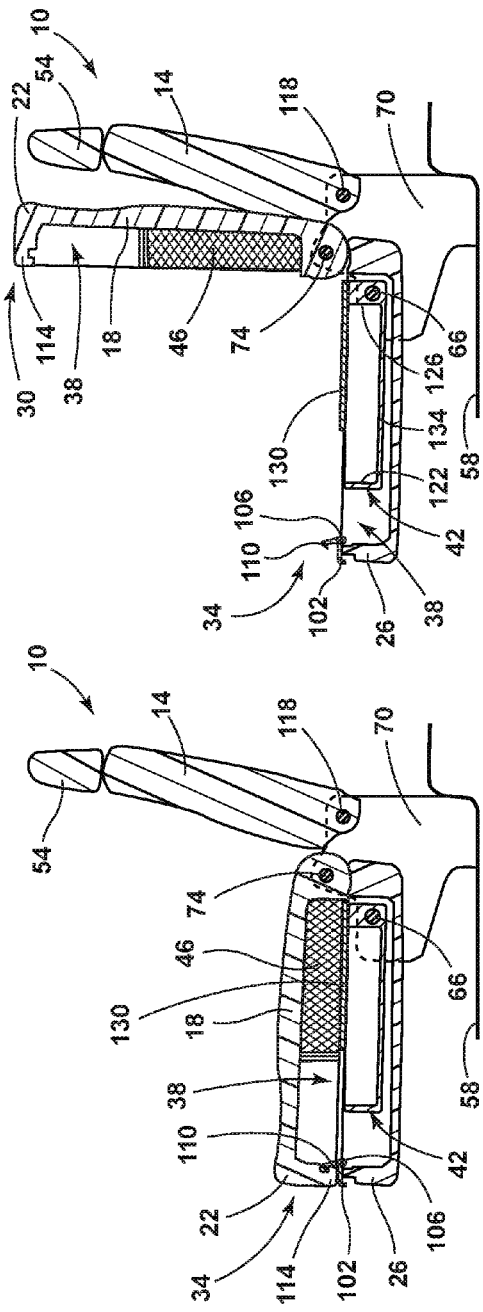
FIG. 4
FIG. 6
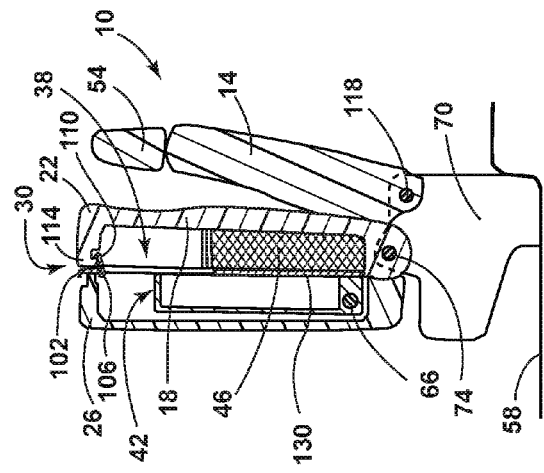
FIG. 5
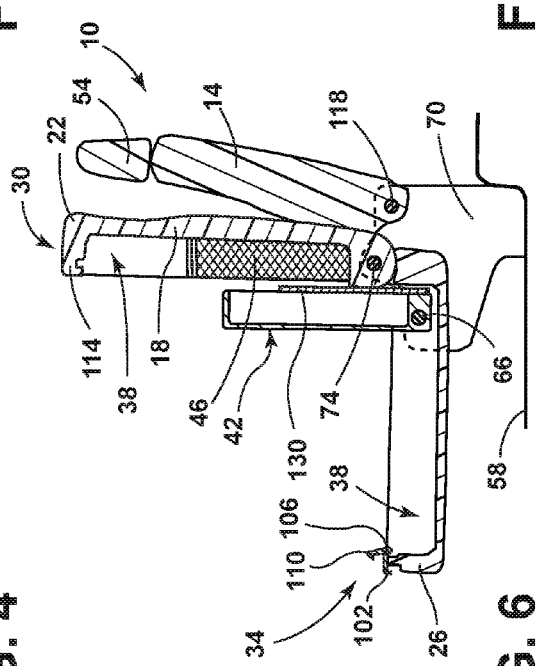
FIG. 7

US 9,950,674 B1

INTEGRATED UNDER SEAT CUSHION CONFIGURABLE STORAGE

FIELD OF THE INVENTION

The present invention generally relates to a vehicle seating assembly and, more particularly, to a new and improved folding seat assembly incorporating an internal storage compartment.

BACKGROUND OF THE INVENTION

Vehicle operators and consumers express a desire for additional and versatile storage space in their motor vehicles. The need and desire for this additional space and versatility is important as guidance to maximize the space provided in motor vehicles where space is limited and secure storage may be desired for a variety of tools, packages, and the like. Creatively developing and engineering alternative options to store a consumer's materials could likely improve the utility of any vehicle.

SUMMARY OF THE INVENTION

One aspect of the present invention includes a vehicle seating assembly having a seatback, a seat base including a first section and a second section wherein the first and second sections are separately and pivotally operable between a raised position and a lowered position, an internal storage compartment defined between the first and second sections, an interior bin coupled to the second section of the internal storage compartment wherein the interior bin is separately pivotable between the raised and lowered positions, and a partition defined within the first section of the internal storage compartment.

Another aspect of the present invention includes a vehicle seating assembly having a seatback, a seat base including a first section and a second section wherein the first and second sections separately pivot between raised and lowered positions, an internal storage compartment defined between the first and second sections, and an interior bin coupled to the second section of the internal storage compartment wherein the interior bin separately pivots between the raised and lowered positions.

Another aspect of the present invention includes a vehicle seating assembly having a seatback, a seat base including first and second sections that are selectively operable between raised, lowered, and open positions, an internal storage compartment defined between the first and second sections, and a partition coupled to the first section to subdivide the internal storage compartment.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a schematic cross-sectional view of a first position of the vehicle seating assembly of FIG. 3 taken along the line IV-IV;

FIG. 5 is a schematic cross-sectional view of a second position of the vehicle seating assembly of FIG. 4;

FIG. 6 is a schematic cross-sectional view of a third position of the vehicle seating assembly of FIG. 4; and FIG. 7 is a schematic cross-sectional view of a fourth position of the vehicle seating assembly of FIG. 4.

DETAILED DESCRIPTION OF THE PREFERRED EMBODIMENTS

Figure 1:
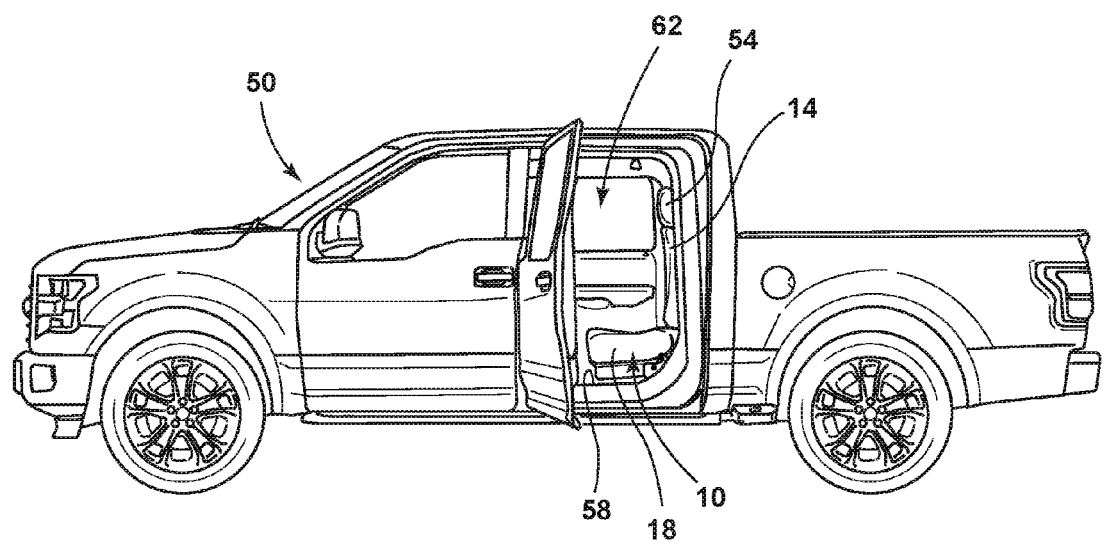
FIG. 1 is a side perspective view of a vehicle seating assembly disposed in a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, the reference numeral 10 generally designates a vehicle seating assembly. The vehicle seating assembly 10 includes a seatback 14 and a seat base 18 including a first section 22 and a second section 26 where the first and second sections 22, 26 collectively or sequentially pivot between a raised position 30 and a lowered position 34. An internal storage compartment 38 is defined between the first and second sections 22, 26 of the seat base 18. An interior bin 42 is coupled to the second section 26 of the internal storage compartment 38 where the interior bin 42 independently pivots between the raised and lowered positions 30, 34. A partition 46 is coupled to the first section 22 to segregate and at least partially enclose a portion of the internal storage compartment 38.

As shown in FIG. 1, the vehicle seating assembly 10 is generally configured for use in a vehicle 50 as either a front driver's seat, a front passenger's seat, and/or a rear seat of the vehicle 50. The vehicle seating assembly 10 generally includes the seatback 14 and the seat base 18 with a headrest 54 that may also be mounted to the top of the seatback 14. The seat base 18 may be configured to be mounted on a support surface, such as a floor pan 58 of the vehicle 50. The vehicle seating assembly 10 is positioned in an interior space 62 of the vehicle 50. The vehicle seating assembly 10 shown in FIG. 1 is positioned in a truck, although the type of vehicle 50 is not meant to be limiting and the vehicle seating assembly 10 could additionally be positioned in a car, minivan, or any other vehicle 50.

Figure 2:
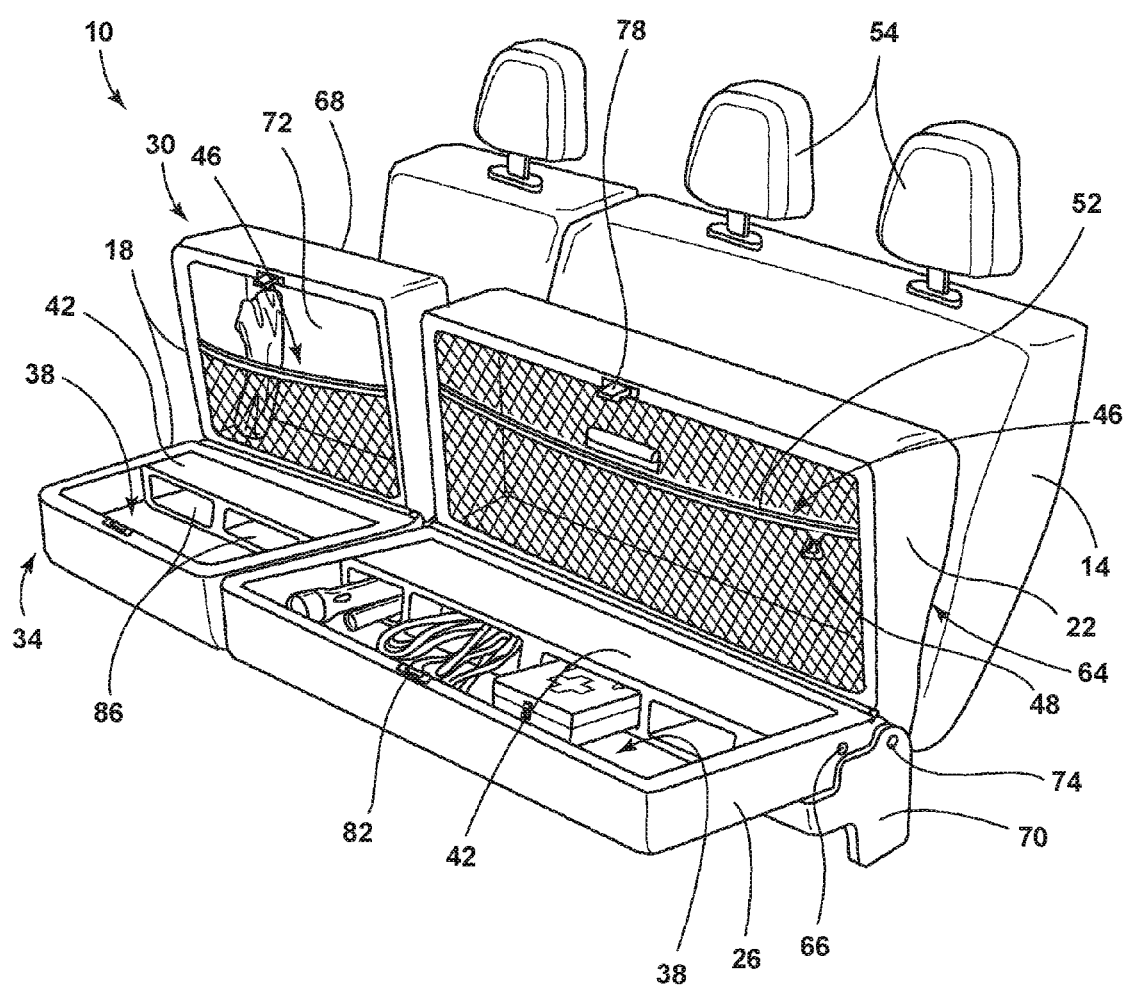
FIG. 2 is a perspective view of an aspect of the vehicle seating assembly.

Referring now to FIG. 2, the vehicle seating assembly 10 is shown with the headrest 54 coupled to the seatback 14. In addition, the seat base 18 has the first section 22 and the second section 26 defining the internal storage compartment 38. The internal storage compartment 38 is defined by the space enclosed between the first and second sections 22, 26 where the interior bin 42 is coupled to the second section 26 within the internal storage compartment 38 through a first pivot pin 66. The first section 22 may have the partition 46 coupled thereto wherein the partition 46 at least partially divides the internal storage compartment 38. Both the first section 22 and the second section 26 of the seat base 18 are connected to a support 70 through a second pivot pin 74. Additionally shown in FIG. 2, the first section 22 of the seat base 18 has a seat latch 78 that may be coupled with a receiving member 82 that is coupled to the second section 26 of the seat base 18. The seat latch 78 and the receiving member 82 provide a means for securely coupling the first and second sections 22, 26 of the seat base 18 to provide comfort and safety for a passenger in addition to securing the items stored in the storage compartment 38 and/or interior bin 42. The means for securely coupling the first and second sections 22, 26 of the seat base 18 may be varied in other embodiments. The interior bin 42 may have one or more storage compartments 86 that can provide individualized storage space for the variety of items a passenger or user may want to store.

As further shown in FIG. 2, the first section 22 includes a first face 68 forming a seating surface 64 and a second face 72 coupled to the partition 46 wherein the partition 46 contacts the interior bin 42 when the first and second sections 22, 26 are in the lowered position 34. In addition, the second face 72 of the first section 22 may include a concavity forming a portion of the internal storage compartment 38 and the partition 46 where the partition 46 and second face 72 cooperate to define the subdivided portion of the storage compartment. In some embodiments, the interior bin 42 and the partition 46 may be switched where the interior bin 42 is coupled to the first section 22 and the partition 46 is coupled to the second section 26. In other embodiments, the interior bin 42 may be coupled to both the first and second sections 22, 26 or the partition 46 may be coupled to both the first and second sections 22, 26.

In some embodiments, the partition 46 may have an opening member 48 and a fastening member 52. The partition 46 may be made from a variety of materials that may be coupled to the first section 22 of the seat base 18. For example, the partition 46 may be fabricated from an elastic mesh material, leather, nylon, polyester, cotton, and/or other synthetic material. In some embodiments, the fastening member 52 of the partition 46 may be, for example, a zipper, a hook and loop fastener, a snap, a magnet, and/or a strap. The fastening member 52 is used to close or fasten the partition 46 so the contents therein may be at least partially contained. The opening member 48, used to open the fastening member 52, may be, for example, a pull tab, a zipper, a grip, or a release handle.

The interior bin 42 may be customized in a variety of embodiments to suit a wide spectrum of storage uses. For example, in some embodiments, the interior bin 42 may be made of an NVH (noise, vibration and hardness) management material. These NVH management materials can include, but are not limited to, ceramic, thermoplastic, thermoset polymer system, metals, combinations thereof, and other similar materials. One or more storage compartments 38 may be enclosed within the internal storage compartment 38 formed by the first and second sections 22, 26 of the seat base 18. The one or more storage compartments 38 may be fully enclosed to provide a waterproof space to store sensitive or delicate materials. The one or more storage compartments 38 may also be open to provide quick access to the contents therein. In some embodiments, the interior bin 42 may be designed to take up all or part of the space provided by the internal storage compartment 38 of the second section 26. In other embodiments, additional bins that may be moveable or permanently attached to the first and section sections 22, 26 may be added to the internal storage compartment 38 in addition to the interior bin 42. In some embodiments, the interior bin 42 extends the length of the internal storage compartment 38 defined between the first and second sections 22, 26 of the seat base 18. In other embodiments, the interior bin 42 extends for only a portion of the width of the internal storage compartment 38 provided by the first and second sections 22, 26.

Figure 3:
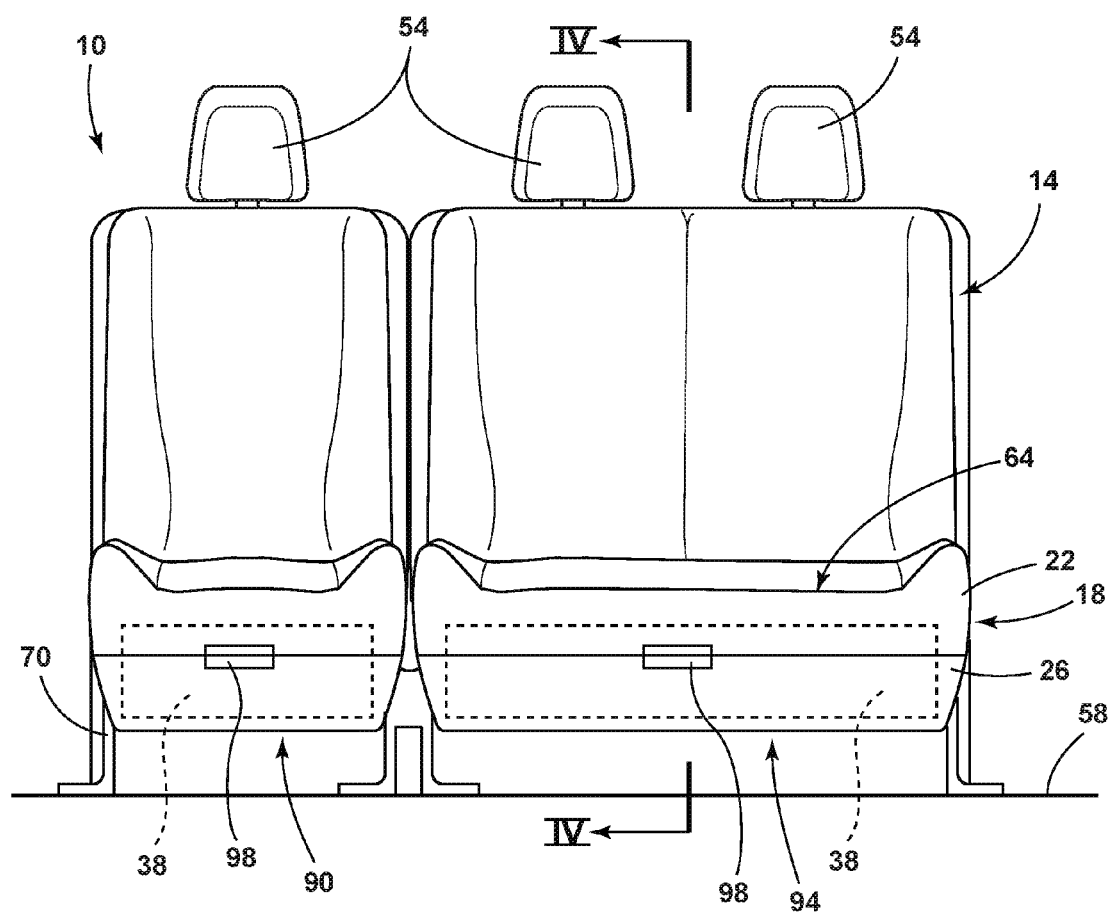
FIG. 3 is a front view showing the vehicle seating assembly.

Referring to FIG. 3, a front view of the vehicle seating assembly 10 shows the assembly as a first seating unit 90 that may sit one passenger and a second seating unit 94 that may sit up to two passengers. The vehicle seating assembly 10 is coupled to the floor pan 58 through one or more supports 70. The internal storage compartment 38 can be seen positioned and defined between the first and second sections 22, 26 of the seat base 18. In some embodiments, the first and second sections 22, 26 of the seat base 18 may be locked or coupled together by a means that may be accessible through a latch opening 98. In other embodiments, the first and second sections 22, 26 may be locked together using an electronic lock, a snap, or any other fastening means known in the art to securely position the sections 22, 26 together. Both the first seating unit 90 and the second seating unit 94 may have the latch opening 98 where a passenger can trigger the seat latch 78 to decouple the receiving member 82 so that the internal storage compartment 38 and the interior bin 42 (FIG. 2) may be accessed.

Referring to FIG. 4, the vehicle seating assembly 10 is shown in a first position. In the first position, the first section 22, the second section 26, and the interior bin 42 are each in the lowered position 34. In the first position, the first and second sections 22, 26 of the seatback 14 are coupled together to enclose the internal storage compartment 38 and interior bin 42. In some embodiments, a lift member 102 coupled to a first latch 110 of the first section 22 is shown with the first latch 110 coupled to a flange 114 of the second section 26 to securely maintain each portion of the seat base 18 together in the lowered position 34 so a passenger may sit. The lift member 102 is actuated by a user to couple and decouple the first latch 110 from the flange 114 through a spring 106. In other embodiments, the mechanism to secure the first and second sections 22, 26 of the seatback 14 are as described in FIG. 2.

Referring to FIG. 5, the vehicle seating assembly 10 is shown in a second position. In the second position, the first section 22 of the seat base 18 is shown in the raised position 30 while both the interior bin 42 and the second section 26 are shown in the lowered position 34. This configuration of first and second sections 22, 26 can be further described as an open position of the vehicle seating assembly 10. In the open position, the interior bin 42 is selectively operable between respective raised and lowered positions. The second position allows a passenger to access both the internal storage compartment 38 and interior bin 42 of the second section 26 in addition to the internal storage compartment 38 and the partition 46 of the first section 22 to access any stored materials or goods. As shown in FIG. 5, the interior bin 42 may have a front bin wall 122, a rear bin wall 126, a top bin wall 130, and a bottom bin wall 134. The top bin wall 130 may extend the entire length of the bottom bin wall 134 to enclose the interior bin 42 space or may extend a portion of the length of the bottom bin wall 134 to leave an opening for the user to access. In some embodiments, the bin walls 122, 126, 130, 134 may be rotatable and/or movable to open or better access the interior bin 42. In other embodiments, the interior bin 42 may not have the front bin wall 122 and/or the top bin wall 130 depending on the type and size of materials to be stored.

Referring to FIG. 6, the vehicle seating assembly 10 is shown in a third position. The third position has both the first section 22 and the interior bin 42 in the raised position 30. Additionally, shown in the third position is the second section 26 of the seat base 18 shown in the lowered position 34. With both the interior bin 42 of the internal storage compartment 38 and the first section 22 in the raised position 30, the passenger may access remaining items in the internal storage compartment 38 of the second section 26. In the third position, the passenger may not be able to completely access the partition 46 of the first section 22 since the interior bin 42 in the raised position 30 may partially block the partition 46 depending on the design. The interior bin 42 is coupled to the second section 26 through the first pivot pin 66 which allows the interior bin 42 to be rotated to any position between and including the raised and lowered positions 30, 34. In some embodiments, the first pivot pin 66 couples the support 70 to both the second section 26 and the interior bin 42.

Referring to FIG. 7, the vehicle seating assembly 10 is shown in a fourth position. In the fourth position, each of the first and second sections 22, 26 and the interior bin 42 are in the raised position 30. When each of the first and second sections 22, 26 and the interior bin 42 are in the raised positions 30, the first latch 110 may again be coupled to the flange 114 to securely lock and fasten the first and second sections 22, 26 of the seat base 18 together in the raised position 30. In the fourth position, a passenger is unable to access any of the internal storage compartment 38 and the interior bin 42 without activating the first latch 110. The seatback 14 is coupled to the support 70 through a seatback pivot 118, the first section 22 is coupled to the support 70 through the second pivot pin 74 and the second section 26 and the interior bin 42 are coupled to the support 70 through the first pivot pin 66.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
   a seatback;
   a seat base including a first section and a second section wherein the first and second sections are separately and pivotally operable between a raised position and a lowered position;
   an internal storage compartment enclosed between the first and second sections;
   an interior bin pivotably coupled to the second section of the internal storage compartment wherein the interior bin is separately pivotable between the raised and lowered positions; and
   a partition defined within the first section of the internal storage compartment.

2. The vehicle seating assembly of claim 1, wherein the interior bin has one or more storage compartments.

3. The vehicle seating assembly of claim 1, wherein the interior bin extends a length of the internal storage compartment defined between the first and second sections of the seat base.

4. The vehicle seating assembly of claim 1, wherein the first section includes a first face forming a seating surface and a second face coupled to the partition wherein the partition contacts the interior bin when the first and second sections are in the lowered position.

5. The vehicle seating assembly of claim 1, wherein the partition includes a material selected from the group consisting of an elastic mesh material, leather, nylon, polyester, and cotton.

6. The vehicle seating assembly of claim 1, wherein the partition is closed with a fastener selected from the group consisting of a zipper, a hook and loop fastener, a snap, a magnet, and a strap.

7. The vehicle seating assembly of claim 1, further comprising a latch coupled to the second section and a flange coupled to the first section wherein the latch and the flange lock the first and second sections of the seat base together.

8. The vehicle seating assembly of claim 1, wherein the first section includes a first face forming a seating surface and a second face including a concavity forming a portion of the internal storage compartment.

9. A vehicle seating assembly, comprising:
a seatback;
a seat base including a first section and a second section wherein the first and second sections separately pivot between raised and lowered positions;
an internal storage compartment enclosed between the first and second sections; and
an interior bin pivotably coupled to the second section of the internal storage compartment wherein the interior bin separately pivots between the raised and lowered positions.

10. The vehicle seating assembly of claim 9, wherein the interior bin has one or more storage compartments.

11. The vehicle seating assembly of claim 9, wherein the interior bin extends a length of the internal storage compartment defined between the first and second sections of the seat base.

12. The vehicle seating assembly of claim 9, wherein the interior bin is constructed from a thermoset polymer.

13. The vehicle seating assembly of claim 9, further comprising a support and a first pivot connection for pivotally attaching the first and second sections to the support wherein the support couples the vehicle seating assembly to a floor pan of a vehicle.

14. The vehicle seating assembly of claim 9, further comprising a latch coupled to the second section and a flange coupled to the first section wherein the latch and the flange lock the first and second sections of the seat base together.

15. The vehicle seating assembly of claim 9, wherein the first section includes a first face forming a seating surface and a second face including a concavity forming a portion of the internal storage compartment.

16. A vehicle seating assembly, comprising:
a seatback;
a seat base including first and second sections that are selectively operable between raised, lowered, and open positions;
an internal storage compartment enclosed between the first and second sections; and
an interior bin having one or more storage compartments that is pivotably coupled to the second section of the internal storage compartment wherein the interior bin separately pivots between the raised and lowered positions.

17. The vehicle seating assembly of claim 16, wherein a partition coupled to the first section to subdivide the internal storage compartment includes a material selected from the group consisting of an elastic mesh material, leather, nylon, polyester, and cotton.

18. The vehicle seating assembly of claim 16, wherein a partition coupled to the first section to subdivide the internal storage compartment is closed with a fastener selected from the group consisting of a zipper, a hook and loop fastener, a snap, a magnet, and a strap.

19. The vehicle seating assembly of claim 16, further comprising a latch coupled to the second section and a flange coupled to the first section wherein the latch and the flange lock the first and second sections of the seat base together.

20. The vehicle seating assembly of claim 16, wherein the first section includes a first face forming a seating surface and a second face including a concavity forming a portion of the internal storage compartment.

* * * * *